United States Patent
Kang et al.

(10) Patent No.: US 10,341,806 B2
(45) Date of Patent: Jul. 2, 2019

(54) METHOD AND APPARATUS FOR TRANSMITTING AND RECEIVING SYSTEM INFORMATION

(71) Applicant: KT CORPORATION, Gyeonggi-do (KR)

(72) Inventors: Seunghyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/569,133

(22) PCT Filed: May 17, 2016

(86) PCT No.: PCT/KR2016/005215
§ 371 (c)(1),
(2) Date: Oct. 25, 2017

(87) PCT Pub. No.: WO2016/186430
PCT Pub. Date: Nov. 24, 2016

(65) Prior Publication Data
US 2018/0109912 A1    Apr. 19, 2018

(30) Foreign Application Priority Data

May 18, 2015  (KR) .................. 10-2015-0068715
Aug. 13, 2015  (KR) .................. 10-2015-0114876
Mar. 8, 2016  (KR) .................. 10-2016-0027594

(51) Int. Cl.
*H04W 4/02*   (2018.01)
*H04L 5/00*   (2006.01)
(Continued)

(52) U.S. Cl.
CPC ............. *H04W 4/02* (2013.01); *H04L 1/08* (2013.01); *H04L 5/001* (2013.01); *H04L 5/003* (2013.01);
(Continued)

(58) Field of Classification Search
CPC ..... H04W 4/02; H04W 48/12; H04W 72/042; H04W 72/0446; H04W 72/0453;
(Continued)

(56) References Cited

U.S. PATENT DOCUMENTS

2010/0041426 A1* 2/2010 Halfmann ............ H04W 16/10
455/509
2013/0114393 A1  5/2013 Lee
(Continued)

FOREIGN PATENT DOCUMENTS

WO   2013/129881 A1   9/2013

OTHER PUBLICATIONS

LG Electronics, "Discussions on frequency hopping and subband for Rel-13 MTC UEs", R1-151486, 3GPP TSG RAN WG1 Meeting #80bis, Belgrade, Serbia, Apr. 20-24, 2015, pp. 1-5.
(Continued)

*Primary Examiner* — Luat Phung
(74) *Attorney, Agent, or Firm* — IP Legal Services, LLC

(57) ABSTRACT

Disclosed are a method and an apparatus for configuring a system information transmission resource for an MTC terminal. The method may include configuring a system bandwidth including two or more physical resource blocks with one or more subbands defined by two or more physical resource blocks to enable at least one remaining physical resource block to be located in a center of the system bandwidth and transmitting the system information to a predetermined user equipment (UE) using the subband.

17 Claims, 13 Drawing Sheets

(51) Int. Cl.
*H04W 72/04* (2009.01)
*H04W 74/08* (2009.01)
*H04W 48/12* (2009.01)
*H04L 1/08* (2006.01)
*H04L 1/00* (2006.01)

(52) U.S. Cl.
CPC .......... *H04L 5/0023* (2013.01); *H04L 5/0035* (2013.01); *H04L 5/0053* (2013.01); *H04L 5/0094* (2013.01); *H04W 48/12* (2013.01); *H04W 72/042* (2013.01); *H04W 72/0446* (2013.01); *H04W 72/0453* (2013.01); *H04W 74/0833* (2013.01); *H04L 1/0041* (2013.01)

(58) Field of Classification Search
CPC .. H04W 74/0833; H04L 5/001; H04L 5/0023; H04L 5/003; H04L 5/0035; H04L 5/0053; H04L 5/0094
See application file for complete search history.

(56) References Cited

U.S. PATENT DOCUMENTS

| 2013/0114537 | A1 | 5/2013 | Lee |
| 2014/0254504 | A1 | 9/2014 | Bashar et al. |
| 2015/0131546 | A1* | 5/2015 | Seo .................. H04W 72/0453 370/329 |
| 2015/0334510 | A1 | 11/2015 | Lee |
| 2017/0244537 | A1* | 8/2017 | Yu ......................... H04L 5/0051 |
| 2017/0279522 | A1* | 9/2017 | Yi ..................... H04W 56/0015 |

OTHER PUBLICATIONS

Samsung, "Considerations of sub-band scheduling for 1.4 MHz MTC UE", R1-150351, 3GPP TSG RAN WG1 Meeting #80, Athens, Greece, Feb. 9-13, 2015, pp. 1-3.

ZTE, "PRB group definition and frequency hopping for MTC enhancement", R1-152954, 3GPP TSG RAN WG1 Meeting #81, Fukuoka, Japan, May 25-29, 2015, pp. 1-6.

Huawei et al., "Frequency location scheduling for low cost MTC UEs", R1-141117, 3GPP TSG RAN WG1 Meeting #76bis, Shenzhen, China, Mar. 31-Apr. 4, 2014, pp. 1-6.

* cited by examiner

METHOD AND APPARATUS FOR TRANSMITTING AND RECEIVING SYSTEM INFORMATION

CROSS REFERENCE TO RELATED APPLICATIONS

This application is a National Stage patent application of PCT International Patent Application No. PCT/KR2016/005215 (filed on May 17, 2016) under 35 U.S.C. § 371, which claims priority to Korean Patent Application Nos. 10-2015-0068715 (filed on May 18, 2015), 10-2015-0114876 (filed on Aug. 13, 2015), and 10-2016-0027594 (filed on Mar. 8, 2016), the teachings of which are incorporated herein in their entireties by reference.

TECHNICAL FIELD

The present disclosure relates to a method and apparatus for configuring a system information transmission resource for a machine type communication (MTC) user equipment. More particularly, the present disclosure relates to a method and apparatus for configuring a transmission resource for transmitting system information for a MTC user equipment, and transmitting and receiving system information using the corresponding transmission resource.

BACKGROUND ART

MTC (Machine Type Communication) means communication between devices or things without human intervention. From the perspective of third generation partnership project (3GPP), 'machine' indicates an entity that does not require direct operation or intervention on the part of a user, and 'MTC' is defined as a type of data communication including one or more machines.

A representative example of the machine may include a smart meter, a vending machine, or the like, which is equipped with a mobile communication module. However, as a smart phone has been introduced that automatically accesses a network and executes communication without user operation or intervention based on the location or situation of a user, a portable terminal having an MTC function has come to be considered as a type of machine.

To support MTC user equipment having extended coverage, System Information (SI) needs to be repeatedly transmitted in a plurality of subframes in the time domain. When SI is repeatedly transmitted in most downlink subframes for user equipment having extended coverage for each transmission period, a PDSCH transmission resource for a DTCH (Dedicated Traffic CHannel) transmission may be insufficient. To overcome the above, an intermittent repetitive transmission method has been suggested. The intermittent repetitive transmission method repeatedly transmits SI only in a predetermined subframe or a predetermined transmission period.

In this instance, a transmission resource for transmitting system information for MTC user equipment needs to be configured.

DETAILED DESCRIPTION OF THE INVENTION

Technical Problem

Therefore, the present disclosure has been made in view of the above-mentioned problems, and an aspect of the present disclosure is to provide a method and apparatus for configuring a transmission resource for transmitting system information for MTC user equipment and transmitting and receiving system information using the corresponding transmission resource.

Also, the present disclosure aims to provide a method and apparatus for improving efficiency of resource allocation by configuring a subband to enable a remaining physical resource block to be located in the center of frequency resources by taking into consideration that a PBCH and a PSS/SSS are transmitted in six central physical resource blocks.

Also, the present disclosure is to provide a method and apparatus for scheduling a frequency domain to be used for transmitting system information using a configured subband of MTC user equipment.

Technical Solution

In accordance with an aspect of the present disclosure, there is provided a method of transmitting system information by a base station, the method including: configuring a system bandwidth, which includes two or more physical resource blocks, with one or more subbands defined by two or more physical resource blocks, to enable at least one remaining physical resource block to be located in the center of the system bandwidth; and transmitting the system information to predetermined user equipment using a subband.

In accordance with another aspect of the present disclosure, there is provided a method of receiving system information by user equipment, the method including: receiving the system information from a base station using one or more subbands defined by two or more physical resource blocks, wherein a system bandwidth is configured with two or more physical resource blocks to enable at least one remaining physical resource block to be located in the center of the system bandwidth; and decoding the system information.

In accordance with another aspect of the present disclosure, there is provided a base station that transmits system information, the base station including: a controller that configures a system bandwidth, which includes two or more physical resource blocks, with one or more subbands defined by two or more physical resource blocks, to enable at least one remaining physical resource block to be located in the center of the system bandwidth; and a transmitting unit that transmits the system information to predetermined user equipment using a subband.

In accordance with another aspect of the present disclosure, there is provided user equipment that receives system information, the user equipment including: a receiving unit that receives system information from a base station using one or more subbands defined by two or more physical resource blocks, wherein a system bandwidth is configured with two or more physical resource blocks to enable at least one remaining physical resource block to be located in the center of the system bandwidth; and a controller that decodes the received system information.

Advantageous Effects

According to the present disclosure, a transmission resource may be configured for transmitting system information for an MTC UE, and system information may be transmitted and received using the corresponding transmission resource.

Also, according to the present disclosure, the efficiency of resource allocation may be improved by configuring a subband to enable a remaining physical resource block to be located in the center of frequency resources by taking into consideration that a PBCH and a PSS/SSS are transmitted in six central physical resource blocks.

Also, according to the present disclosure, a frequency domain to be used for transmitting system information may be scheduled using a configured subband for MTC user equipment.

MODE FOR CARRYING OUT THE INVENTION

Figure 1:
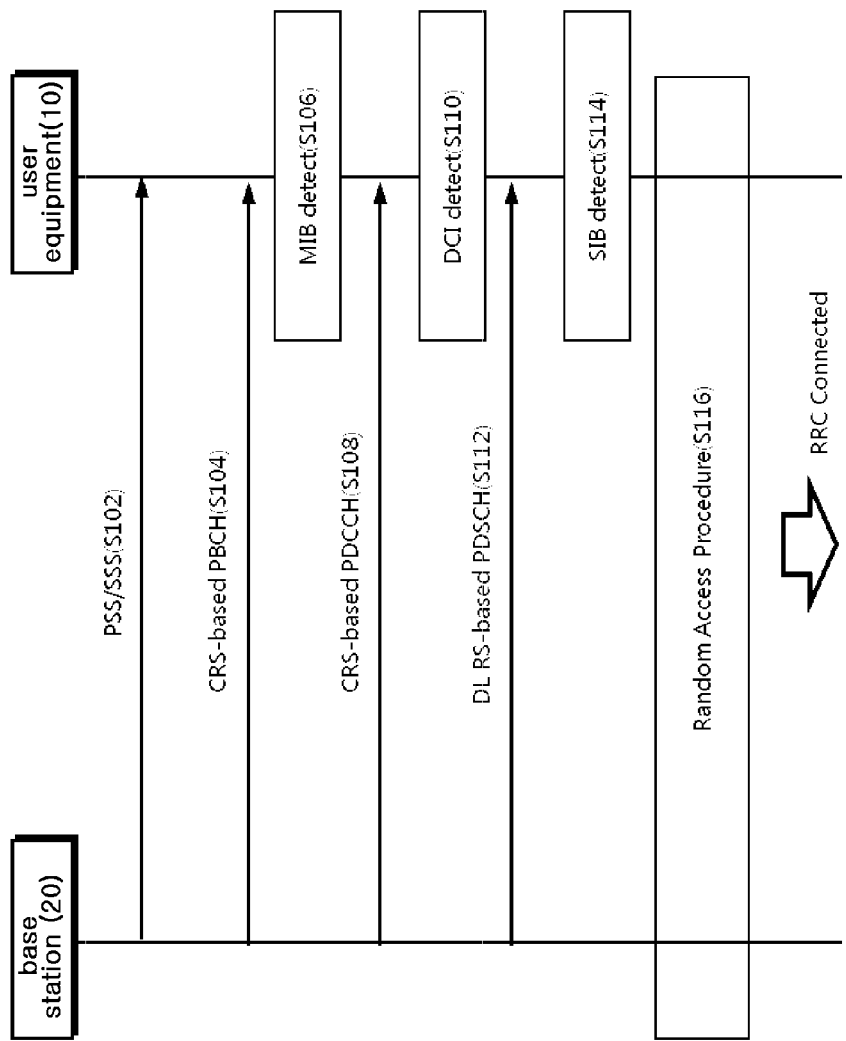
FIG. 1 illustrates an initial cell access process of user equipment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

In the present specifications, a MTC terminal refers to a terminal that is low cost (or is not complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like.

FIG. 1 illustrates an initial cell access process of user equipment.

Referring to FIG. 1, a wireless communication system may include User Equipment (UE) 10 and a Base Station (BS) 20 that performs, with the UE 10, uplink communication (e.g., PUSCH (Physical Uplink Shared CHannel), PUCCH (Physical Uplink Control CHannel), and PRACH (Physical Random Access CHannel)) and downlink communication (e.g., PDSCH (Physical Downlink Shared CHannel), PDCCH (Physical Downlink Control CHannel), EPDCCH (Enhanced Physical Downlink Control CHannel), PHICH (Physical HARQ Information CHannel), PCFICH (Physical Control Format Information CHannel), and PBCH (Physical Broadcast CHannel)).

Throughout the specifications, the UE 10 may be construed as an inclusive concept indicating a terminal utilized in wireless communication, including UE (User Equipment) in wideband code division multiple access (WCDMA), LTE, high speed packet access (HSPA), and the like, and a MS (Mobile station), a UT (User Terminal), an SS (Subscriber Station), a wireless device, and the like in global systems for mobile communication (GSM).

The BS 20 or a cell may generally refer to a station performing communication with the UE 10. The BS 20 (e.g., cell) may also be referred to as a Node-B, an eNodeB (evolved Node-B), a sector, a site, a BTS (Base Transceiver System), an access point, a relay node, an RRH (Remote Radio Head), an RU (Radio Unit), a small cell, and the like.

Also, the BS 20 may be construed as an inclusive concept indicating some areas or functions covered by a BSC (Base Station Controller) in CDMA, a Node-B in WCDMA, an eNB or a sector (site) in LTE, and the like, and the concept may include various coverage areas, such as a megacell, a macrocell, a microcell, a picocell, a femtocell, an RRH (Radio Resource Head), a communication range of a relay node, and the like.

Each of the above mentioned various cells has a BS that controls a corresponding cell, and thus the BS may be construed in two ways. i) the BS may be a device that provides a megacell, a macrocell, a microcell, a picocell, a femtocell, and a small cell in association with a wireless area, or ii) the BS may be a wireless area. In i), a BS may be any device that interact with one another so as to enable the devices that provide a predetermined wireless area to be controlled by an identical entity or to cooperatively configure the wireless area. Based on a configuration type of a wireless area, an eNB, an RRH, an antenna, an RU, a LPN, a point, a transmission/reception point, a transmission point, a reception point, and the like may be embodiments of a BS. In ii), a BS may be a wireless area itself that receives or transmits a signal from the perspective of user equipment or a neighboring BS.

Therefore, a megacell, a macrocell, a microcell, a picocell, a femtocell, a small cell, an RRH, an antenna, an RU, an LPN (Low Power Node), a point, an eNB, a transmission/reception point, a transmission point, and a reception point are commonly referred to as a BS.

In the specifications, the UE and the BS are used as two inclusive transceiving subjects to embody the technology and technical concepts described in the specifications, and the UE and the BS may not be limited to a predetermined term or word. In the specification, the UE and the BS are used as two (uplink or downlink) inclusive transceiving subjects to embody the technology and technical concepts described in the specifications, and the UE and the BS may not be limited to a predetermined term or word. Here, Uplink (UL) refers to a scheme for a UE to transmit data to and receive data from a BS, and Downlink (DL) refers to a scheme for a BS to transmit data to and receive data from a UE.

Multiple access schemes may be unrestrictedly applied to the wireless communication system. Various multiple access schemes may be used and include such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that has advanced through GSM, WCDMA, and HSPA to LTE and LTE-advanced, and the embodiments may be applicable to resource allocation in a synchronous wireless communication scheme that has advanced through CDMA and CDMA-2000 to UMB. The embodiments of the present disclosure may not be limited to a specific wireless communication field. For example, the embodiments of the present disclosure may be applicable to other technical fields related to the technical idea of the present disclosure.

Uplink transmission and downlink transmission may be performed based on a TDD (Time Division Duplex) scheme or an FDD (Frequency Division Duplex) scheme. The TDD scheme performs transmission based on different times. The FDD (Frequency Division Duplex) scheme performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point, or the transmission/reception point (transmission point or transmission/reception point) itself.

A wireless communication system according to embodiments refers to a coordinated multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH that is connected to the eNB through an optical cable or an optical fiber and is controlled in a wired manner, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multi-transmission/reception point and a receiver may be a part of a terminal. In an uplink, a transmitter may be a part of a terminal and a receiver may be a part of a multi-transmission/reception point.

Hereinafter, the situation in which a signal is transmitted and received through a channel, such as a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH", includes the meaning that an EPDCCH is transmitted or received or that a signal is transmitted or received through an EPDCCH.

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher-layer signaling includes RRC signaling that transmits RRC information including an RRC parameter.

The BS 20 performs downlink transmission to terminals. The eNB may transmit a Physical Downlink Shared Channel (PDSCH), which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (e.g. a Physical Uplink Shared Channel (PUSCH)). Hereinafter, transmission and reception of a signal through each channel will be described as transmission and reception of a corresponding channel.

Also, the BS 20 may be referred to as a Transmission Point (TP) from the perspective of transmission of downlink communication to the UE 10, may be referred to as a Reception Point (RP) from the perspective of reception of uplink communication from the UE 10, or may be referred to as a point or a transmission and reception point.

MTC (Machine-Type Communication) is defined as communication between devices or things without human intervention. From the perspective of 3GPP, "machine" indicates an entity that does not require a user's direct operation or intervention, and "MTC" is defined as a type of data communication including one or more machines. As a representative example of the machine may include a smart meter, a vending machine, or the like, which is equipped with a mobile communication module. However, as a smart phone has been introduced that automatically accesses a network and executes communication without user operation or intervention based on the location or situation of a user, a portable terminal having an MTC function has come to be considered a type of machine.

As an LTE network has been spread, mobile carriers desire to minimize the number of RATs (Radio Access Terminals) to reduce maintenance costs of the network or the like. However, the number of typical GSM/GPRS network-based MTC products has been increasing, and an MTC that uses a low data transmission rate can be provided at low cost. Therefore, the LTE network is used for general data transmission, and the GSM/GPRS network is used for MTC, and thus the mobile carriers need to separately operate two RATs, which may cause inefficiency in usage of a frequency band, which is a burden from the perspective of the profitability of mobile carriers.

To solve the above drawback, a cheap MTC UE that uses the GSM/EGPRS network needs to be replaced with an MTC UE that uses an LTE network. To this end, various requirements to decrease the price of the LTE MTC UE are discussed in the 3GPP RAN WG1 standards conference. Also, the standards conference has issued a technical document (TR 36.888) including various functions that may be provided to satisfy the requirements.

A main item that is associated with changing a physical layer standard and is currently discussed in 3GPP to support the low-cost LTE MTC UE may be a technology such as supporting a narrow band/single RF chain/half duplex FDD/long DRX (Discontinued Reception), or the like. However, the methods that are considered to decrease the price may decrease the performance of an MTC UE when compared to a legacy LTE terminal.

Also, about 20% of the MTC UEs that support an MTC service such as smart metering are installed in a 'Deep indoor' environment such as a basement. To perform a successful MTC data transmission, the coverage of an LTE MTC UE needs to be improved by 15 [dB], when compared to the coverage of a legacy normal LTE terminal.

Table 1 expresses a link budget of each physical channel as a MCL (Maximum Coupling Loss) value. An FDD PUSCH has the smallest MCL value, and thus, a target MCL value for an improvement of 15 [dB] is 140.7+15=155.7 [dB].

The requirements of an LTE-based low-cost MTC UE are as follows:

A data transmission speed should satisfy at least a data transmission speed provided by an EGPRS-based MTC UE, that is, a downlink speed of 118.4 kbps and an uplink speed of 59.2 kbps.

Frequency efficiency should be dramatically improved when compared to a GSM/EGPRS MTC UE.

A provided service area should not be smaller than that of a GSM/EGPRS MTC UE.

The amount of power consumption should not be higher than a GSM/EGPRS MTC UE.

A legacy LTE UE and an LTE MTC UE should be able to be used in the same frequency.

An existing LTE/SAE network is reused.

Optimization is performed in a TDD mode, in addition to an FDD mode.

A low-cost LTE MTC UE should support a limited mobility and a low-power-consumption module.

A base station is capable of performing resource allocation of a maximum of 6 PRB pairs in a single subframe with respect to an MTC UE, and the maximum available TBS is 1000 bits.

Referring to FIG. 1, in an initial cell access process of a UE, the UE 10 receives a PSS (Primary Synchronization Signal) and an SSS (Secondary Synchronization Signal), which are synchronization signals transmitted by the BS 20, in operation S102. In LTE FDD (Frequency Division Duplex), a PSS may be transmitted in the last symbol (#n) of the first slot of each of subframe #0 and subframe #5 in a single radio frame 10 ms, and an SSS may be transmitted in a previous symbol (#n−1) of the last symbol (#n) of the first slot of each of subframe #0 and subframe #5. In LTE TDD, a PSS/SSS may be transmitted at a location different from that of the FDD.

Through Primary Sync Signal (PSS) Acquisition, a slot timing and an SSS (Secondary Synch Signal) scrambling code may be obtained. Through Secondary Sync Signal (SSS) Acquisition, a frame timing and a cell group ID sequence may be obtained.

The UE 10 may obtain a cell ID and downlink synchronization information by detecting a PSS and an SSS, and the UE 10 may perform additional synchronization and existing

TABLE 1

| Physical channel name | PUCCH (1A) | PRACH | PUSCH | PDSCH | PBCH | SCH | PDCCH (1A) |
|---|---|---|---|---|---|---|---|
| MCL (FDD) [dB] | 147.2 | 141.7 | 140.7 | 145.4 | 149.0 | 149.3 | 146.1 |
| MCL (TDD) [dB] | 149.4 | 146.7 | 147.4 | 146.1 | 149.0 | 149.3 | 146.9 |

Table 2 shows the coverage improvement for each physical channel that is required in order to satisfy a target MCL value.

control channel decoding using a Cell-specific Reference Signal (CRS) based on the information obtained based on the PSS/SSS.

TABLE 2

| Physical channel name | PUCCH (1a) | PRACH | PUSCH | PDSCH | PBCH | SCH | PDCCH (1A) |
|---|---|---|---|---|---|---|---|
| Required Improvement [dB] | 8.5 | 14.0 | 15.0 | 10.3 | 6.7 | 6.4 | 9.6 |

To lower the price of an LTE MTC UE and to increase the coverage, various methods for robust transmission, such as PSD boosting, a low coding rate, time domain repetition and the like, are considered for each physical channel.

Figure 2:
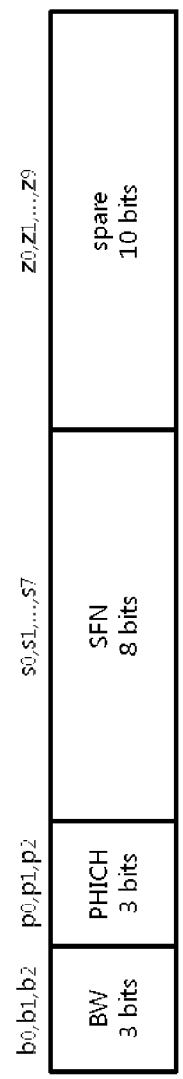
FIG. 2 illustrates a configuration of an MIB.

The UE 10 receives a signal through a PBCH based on a CRS from the BS 20 in operation S104. The UE 10 extracts an MIB (Master Information Block) transmitted through the PBCH in operation S106. Referring to FIG. 2, as provided in the following descriptions, an MIB may include information indicating the bandwidth of a cell, information indicating the configuration of a PHICH, and information indicating a system frame number. The UE 10 may be aware of the resource to which a PDCCH is allocated, based on information included in the MIB.

The UE 10 receives a signal through a PDCCH based on a CRS from the BS 20 in operation S108. The UE 10 extracts Downlink Control Information (DCI) transmitted through the PDCCH in operation S110. The DCI may be control information associated with a PDSCH through which a SIB (System Information Block) is transmitted. Such DCI may be transferred through a common search space. In other words, a PCFICH is decoded and the number of symbols allocated for a PDCCH is detected. DCI with respect to SIB1 may be decoded from the PDCCH. SIB1 is decoded, and time-domain scheduling information associated with other SIBs is obtained.

The UE 10 receives a signal through a PDSCH based on DL (Downlink RS) from a BS based on DCI in operation S112. The UE 10 extracts another SIB transmitted through a PDSCH in operation S114. DCI associated with SIBs other than SIB1 is decoded from a PDCCH. Other SIBs are decoded.

Subsequently, the UE 10 and the BS 20 perform a random access procedure in operation S116, and the UE 10 is changed from an RRC idle state into an RRC connected state.

System information that the BS 20 transmits through a PBCH is referred to as an MIB (Master Information Block).

FIG. 2 illustrates configuration of an MIB.

Referring to FIG. 2, an MIB may include a 'dl-Bandwidth' field (BW), a 'phich-Config' field (PHICH), a 'systemFrameNumber' field (SFN), and a 'spare' field (spare).

```
z                   z           z        z
-- ASN1START
MasterInformationBlock ::=          SEQUENCE (
        dl-Bandwidth        ENUMERATED {
                              n6, n15, n25, n50, n75, n100},
        phich-Config        PHICH-Config,
        systemFrameNumber       BIT STRING (SIZE (8)),
        spare               BIT STRING (SIZE (10))
)
-- ASN1STOP
```

The 'dl-Bandwidth' field may be used for indicating the width of a cell based on a Resource Block (RB) unit. In LTE and LTE-A system, a single cell may include 6, 15, 25, 50, 75, or 100 RBs, and a 3-bit 'dl-Bandwidth' field may be used for indicating the value of one of them.

The 'phich-Config' field may be used for indicating a PHICH resource for transmitting A/N (Acknowledgement/Negative Acknowledgement) with respect to a PUSCH. The 'phich-Config' field may be formed of 3 bits, wherein one bit for indicating a PHICH duration and 2 bits for indicating a PHICH resource may be included. The PHICH duration may indicate the number of OFDM (Orthogonal Frequency Division Multiplex) symbols to which a PHICH is allocated. When the value of the PHICH duration is 0 (Normal), a PHICH may be located in a first OFDM symbol of a subframe. When the value of the PHICH duration is 1 (Extended), the PHICH may be located in the first two or three OFDM symbols of the subframe. The PHICH resource may indicate a resource occupancy of a PHICH, and the PHICH resource may be a value of ⅙, ½, 1, or 2.

The 'systemFrameNumber' field may be used for indicating an SFN (System Frame Number) of 10 bits. Here, the SFN may have a value in the range of 0 to 1023, and the SFN may have a value that is repeated from 0 to 1023 based on a 1024-frame period. 8 bits of the 10-bit system frame number may be indicated by the 'systemFrameNumber' field, and two bits may be implicitly obtained by decoding a PBCH corresponding to a 4-radio frame (40 ms) period. Therefore, the 'systemFrameNumber' field may include 8 bits from the Most Significant Bit (MSB) of the system frame number.

Also, a 10-bit 'spare' field may be kept in reserve.

The MIB is formed of a total of 24 bits. For the transmission of a PBCH including the MIB, the coding process illustrated in FIG. 1 may be performed.

Figure 3:
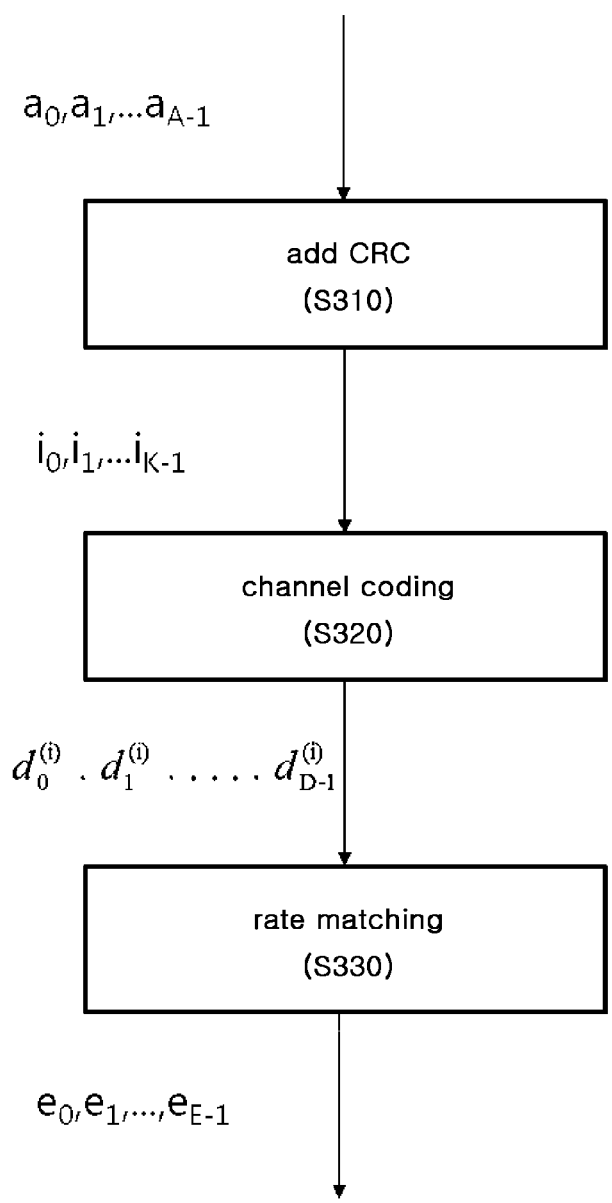
FIG. 3 illustrates an example of a PDCCH coding method.

FIG. 3 illustrates an example of a PDCCH coding method.

Referring to FIG. 3, 16-bit Cyclic Redundancy Check (CRC) is generated using a 24-bit MIB ($a_0, a_1, \ldots a_{A-1}$). In this instance, a 16-bit CRC mask configured according to the number of transmission antennas may be scrambled in the generated 16-bit CRC. An information bit block of a total of 40 bits is generated by adding the 16-bit scrambled CRC after the 24-bit MIB in operation S310.

The 40-bit information bit is encoded using a TBCC (Tail-Biting Convolutional Code) in operation S320.

The length of a TBCC-encoded mother code word ($d_0^{(i)}, d_1^{(i)}, \ldots, d_{D-1}^{(i)}$) is 120 bits. The mother code may be repeated as a 1920-bit code word ($e_0, e_1, \ldots, e_{E-1}$) through a rate matching process in operation S330.

Figure 4:
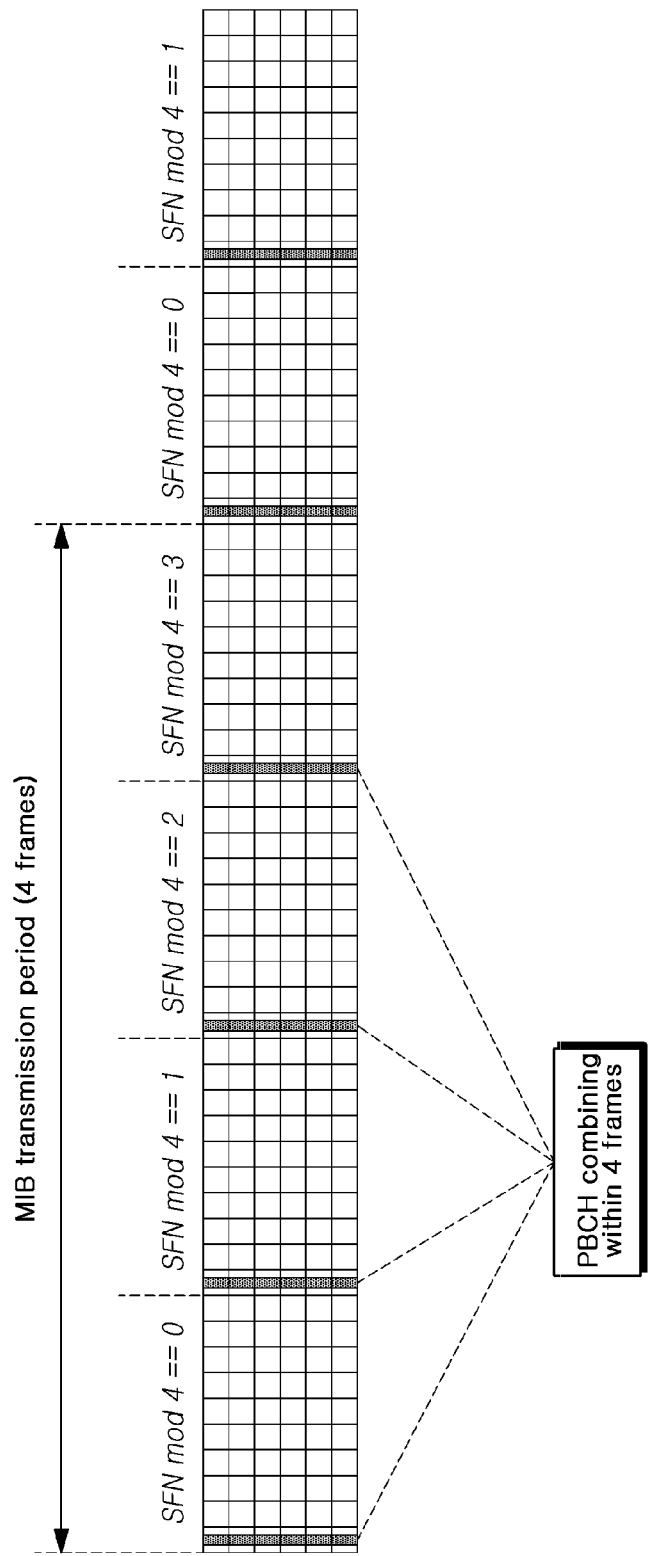
FIG. 4 illustrates a resource in which a PBCH is transmitted.

FIG. 4 illustrates a resource for transmitting a PBCH.

Referring to FIG. 4, a PBCH may be located in the first subframe of each frame in the time axis, and in 6 resource blocks (RB) or 72 subcarriers in the frequency domain. The 1920-bit code word is transmitted by 480 bits in the first subframe of each of four frames. Therefore, the MIB transmitted through the PBCH may be changed when an SFN (System Frame Number) corresponds to SFN mod 4=0, and the MIB may be transmitted using only a subframe number 0 (SF#0) for each frame. Also, the MIB may be transmitted using only 4 OFDM symbols, of which OFDM symbol indices i (i=0, 1, 2, . . . , 13) are 7, 8, 9, and 10 from among 14 OFDM symbols of SF#0.

Also, the transmitted 480-bit code word may be configured as a decodable code word. A UE may decode a PBCH code word transmitted based on a 4-frame period, by combining received values of a code word transmitted in a corresponding period.

Therefore, decoding may be successfully performed using received values of a code word transmitted in a single frame when a channel condition between a BS and the UE is good. Otherwise, the probability of a successful decoding is increased only when received values of a code word transmitted in a maximum of four frames are combined.

In addition to the MIB transmitted through the PBCH, another piece of system information that a BS transmits through a PDSCH is referred to as an SIB (System Information Block). In association with the SIB, various SIB types may exist according to the type of transferred information, as shown in Table 3 below.

TABLE 3

| SIB | Description of SIB type |
|---|---|
| SIB1 | System Information Block Type 1 (SIB1), which contains parameters needed todetermine if a cell is suitable for cell selection, as well as information about the timedomaininscheduling of the other SIBs. |
| SIB2 | System Information Block Type 2 (SIB2), which includes common and sharedchannel information. |

TABLE 3-continued

| SIB | Description of SIB type |
|---|---|
| SIB3-SIB8 | SIB3-SIB8, which include parameters used to control intra-frequency, inter-frequencyand inter-RAT cell reselection. |
| SIB9 | SIB9, which is used to signal the name of a Home eNodeB (HeNBs). |
| SIB10-SIB12 | SIB10-SIB12, which include theEarthquake and Tsunami Warning Service (ETWS) notifications and Commercial Mobile Alert System (CMAS) warning messages |
| SIB13 | SIB13, which includes MBMS related control information |
| SIB14 | SIB14, which contains Extended Access Barring related information. |
| SIB15 | SIB15, which contain the MBMS Service Area Identities (SAI) of the current and/ orneighboring carrier frequencies. |
| SIB16 | SIB16, which contains information related to GPS time and Coordinated Universal Time (UTC). |

Among the above-described 16 types of SIBs, SIB1 may use fixed time-domain scheduling similar to that of the MIB. The transmission period of a single SIB1 is 8 frames (80 ms), and the signal SIB1 is transmitted over 4 frames of which SFN mod 2=0. Among the frames where SIB1 is transmitted, only SF#5 is used for the transmission of SIB1. Also, a UE may obtain frequency-domain scheduling information associated with transmission of SIB1 by decoding DCI of a PDCCH transmitted in SF#5. The UE may perform blind decoding of the DCI using an SI-RNTI.

Subsequently, a method of scheduling other SIBs (SIB2 to SIB16) excluding SIB1 will be described. Time-domain scheduling information of other SIBs may be transmitted to a UE through the SIB1.

When the UE 10 obtains an SI message, the UE may determine the beginning of an SI window with respect to related SI messages (a beginning of SI messages). That is, n, a number corresponding to the order of an entry, is determined from a list of SI messages configured by scheduling-InfoList in SystemInformationBlockType1 with respect to a related SI message, and an integer (integer value) x=(n−1)*w is determined. In this instance, w indicates the length of a window (si-WindowLength).

An SI window begins from subframe #a of a radio frame of which SFN mod T=FLOOR(x/10). In this instance, a=x mod 10 and T denotes the period (si-Periodicity) of a related SI message.

In this instance, an SI window of 1 ms may be configured only when all SIs are scheduled in a frame of which SFN mod 2=0 before subframe #5.

From the beginning of the SI window, a PDSCH is received using an SI-RNTI. The reception may be continuously performed until the end of the SI window of which the temporal absolute length is si-WindowLength, or until a SI message is received. In this instance, subframe #5, all MBSFN subframes, and all uplink subframes in TDD may be excluded from the frames of which SFN mod 2=0.

When an SI message is not received until the end of the SI window, reception of a related SI message is repeatedly performed in a subsequent SI window.

According to the above-described method, a UE may obtain frequency-domain scheduling information associated with SIB2 to SIB16, transmitted in the SI window, by decoding DCI of a PDCCH transmitted together in a subframe in which a corresponding SIB is transmitted. Also, SIB1 informs a UE of time-domain scheduling information through an SI window w, and thus subframe information associated with the transmission of SIB2 to SIB16 may be obtained only when a UE successfully performs blind decoding of DCI.

As described above, Table 4 and Table 5 show a start subframe number of an SI window (SI-window starts at the subframe #a) and a location of a frame in which an SIB is transmitted (the location of a frame in which SI is transmitted, SFN mod T=FLOOR(x/10)), in association with an SIB repeatedly transmitted based on a period (si-Periodicity) T.

TABLE 4

| | $w$ | | | | | | |
|---|---|---|---|---|---|---|---|
| n-1 | 1 ms | 2 ms | 3 ms | 10 ms | 15 ms | 20 ms | 40 ms |
| 0 | 0 | 0 | 0 | 0 | 0 | 0 | 0 |
| 1 | 1 | 2 | 3 | 0 | 5 | 0 | 0 |
| 2 | 2 | 4 | 6 | 0 | 0 | 0 | 0 |
| 3 | 3 | 6 | 0 | 0 | 5 | 0 | 0 |
| 4 | 4 | 8 | 2 | 0 | 0 | 0 | 0 |
| 5 | 5 | 0 | 5 | 0 | 5 | 0 | 0 |

TABLE 5

| | $w$ | | | | | | |
|---|---|---|---|---|---|---|---|
| n-1 | 1 ms | 2 ms | 3 ms | 10 ms | 15 ms | 20 ms | 40 ms |
| 0 | 0 | 0 | 0 | 0 | 0 | 0 | 0 |
| 1 | 0 | 0 | 0 | 1 | 1 | 2 | 4 |
| 2 | 0 | 0 | 0 | 2 | 3 | 4 | 8 |
| 3 | 0 | 0 | 0 | 3 | 4 | 6 | 12 |
| 4 | 0 | 0 | 1 | 4 | 6 | 8 | 16 |
| 5 | 0 | 1 | 1 | 5 | 7 | 10 | 20 |

The value of the period (si-Periodicity) T is the same for each SIB (SIB2 to SIB16) or for a plurality of SIBs, and may be set to one of 8, 16, 32, 64, 128, 256, and 512. The value of the period (si-Periodicity) T indicates the number of frames.

Figure 5:
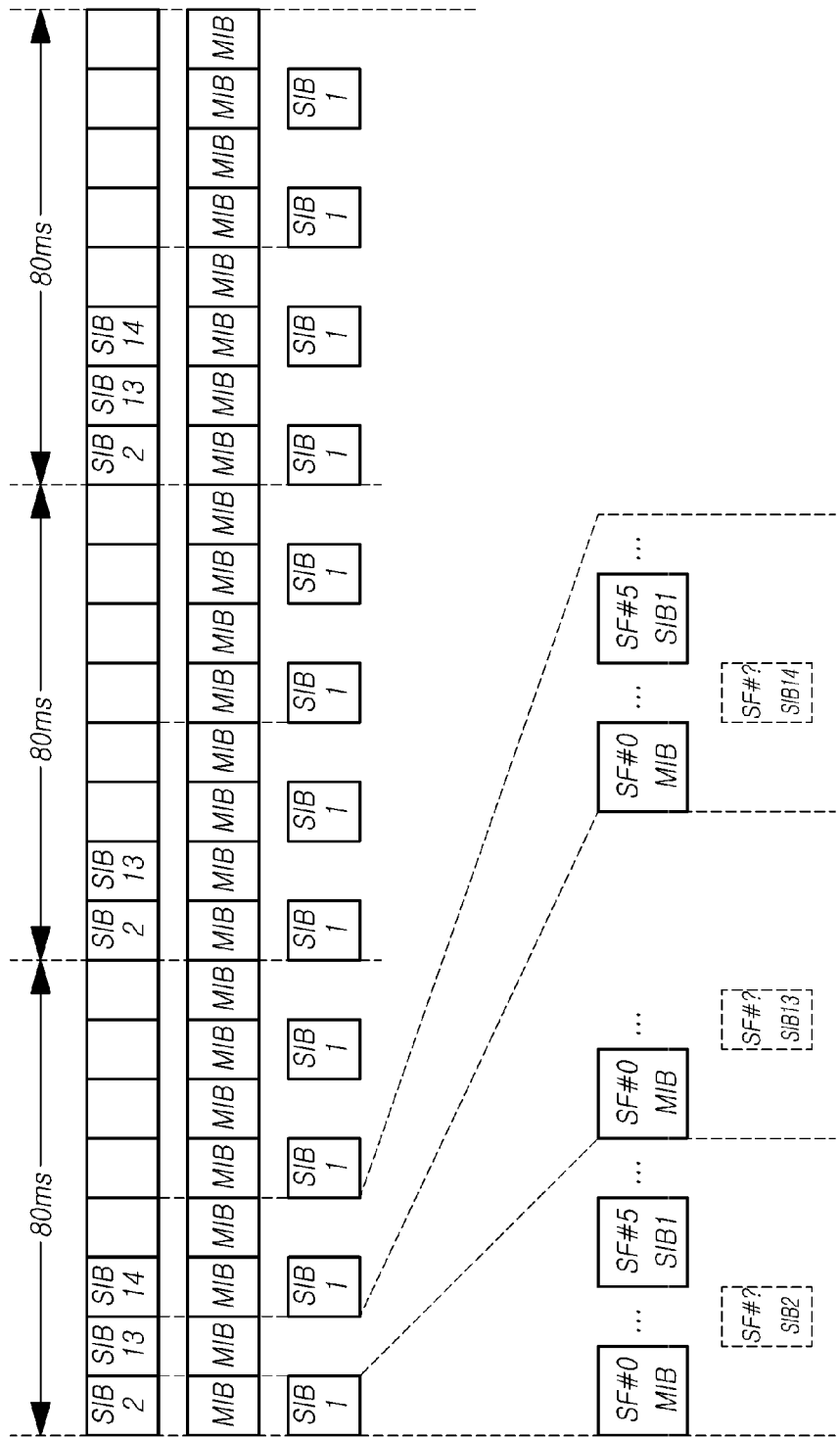
FIG. 5 illustrates system information time-domain scheduling.

For example, when SIB scheduling information transmitted to a UE through SIB1 is as shown below, the location in which an SIB is transmitted is as shown in FIG. 5. FIG. 5 illustrates system information time-domain scheduling.

TABLE 6

W = 10 ms
SIB2: n = 1, T = 8, a = 0, SFN mod T = 0
SIB13: n = 2, T = 8, a = 0, SFN mod T = 1
SIB14: n = 3, T = 16, a = 0, SFN mod T = 2

Subsequently, a method of changing a system information message will be described.

Figure 6:
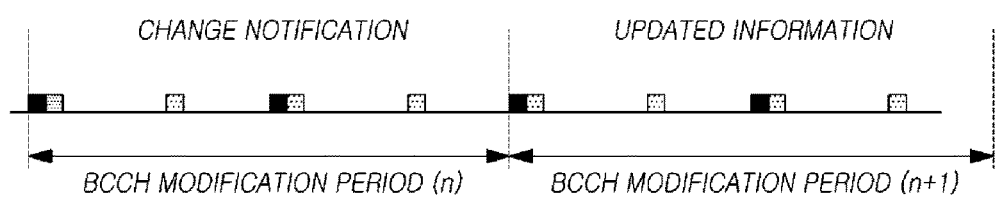
FIG. 6 illustrates a change of system information.

FIG. 6 illustrates a change of system information.

The change of system information occurs in predetermined radio frames. That is, the concept of a modification period in which a change of system information occurs in a predetermined radio frame may be used. System information including the same content may be transmitted many times within a modification period, as defined by scheduling. Modification period boundaries may be defined by SFN values for which SFN mode m=0. m denotes the number of radio frames including a modification period. The modification period is configured based on system information.

When the BS 20 changes system information, the BS 20 may first inform the UE 10 of the change. That is, this is performed through a modification period. In a subsequent modification period, the BS 20 may transmit updated system information. Different colors in FIG. 6 indicate different pieces of system information. As soon as the UE 10 receives a change notification, the UE 10 may immediately obtain newly changed information from the beginning of the subsequent modification period. Until new system information is obtained, the UE may apply previously obtained system information.

A paging message may be used for reporting the change of system information to UEs in the RRC IDLE state and UEs in the RRC CONNECTED state. When the UE 10 receives a paging message including a predetermined parameter, for example, systemInfoModification, the UE 10 may recognize that system information will be changed in a subsequent modification period boundary. Although the change of the system information is known to the UE 10, further details associated with the change of the system information may not be provided.

The predetermined parameter, for example, SystemInformationBlockType1, may include a value tag, systemInfoValueTag, indicating whether a change occurs in system messages. As soon as the UE 10 returns from out of coverage (upon return from out of coverage), the UE 10 may use a value tag, systemInfoValueTag, to verify whether previously stored system information messages are still valid. In addition, three hours after the moment that the UE 10 successfully verifies validity, the UE 10 may determine that the stored system information is invalid unless otherwise specified.

The UE 10 combines only received values of a PBCH code word transmitted within four frames, which correspond to a PBCH transmission period, and the UE 10 may not combine received values of a code word transmitted beyond the PBCH transmission period.

To enable an MTC UE having extended coverage to receive a PBCH, and to perform successful blind-decoding, the BS 20 may need to repeatedly transmit a typically transmitted PBCH 36 to 95 times. In other words, a PBCH code word, which has been typically transmitted using 4 subframes over four frames, need to be transmitted repeatedly using 144 to 384 subframes. In FDD, when it is assumed that a single frame is formed of 10 subframes and all subframes existing in a single frame are used for a PBCH transmission, 15 to 39 frames may be used for transmitting a PBCH for an MTC UE having an extended coverage.

When a large amount of transmission resources is used for an MTC UE having extended coverage, as described above, the amount of transmission resources allocated to other UEs existing in the same cell may be relatively decreased. Also, in terms of the characteristics of a periodically transmitted PBCH, when a transmission period of a PBCH for an MTC UE having extended coverage is too short or a PBCH is continuously transmitted in consecutive frames, other UEs may not be assigned with transmission resources in the worst case. Also, in the case of the MTC UE having extended coverage, the amount of transmission resources that may be allocated to other physical channels excluding a PBCH may be relatively reduced.

When system information uses most downlink transmission resources for a UE having extended coverage for each transmission period, a PDSCH transmission resource for a DTCH (Dedicated Traffic Channel) transmission, which is transmitted to each UE, may be somewhat insufficient.

To overcome the above, a method of performing intermittent repetitive transmission of system information is suggested in accordance with embodiments of the present disclosure. More particularly, system information is intermittently repeatedly transmitted for a UE having extended coverage in only a predetermined transmission period, and at times other than the predetermined system information transmission period, the system information is transmitted in the same manner as in the typical method in accordance with at least one embodiment of the present disclosure This is referred to as an 'intermittent system information repetitive transmission method' or an 'intermittent PBCH repetitive transmission method'.

The present disclosure provides a method of transmitting system information for an MTC UE having extended coverage, and more particularly, to a method and apparatus for configuring a transmission resource for transmitting system information.

The present disclosure relates to a method and apparatus for transmitting system information for an MTC UE having extended coverage. More particularly, the present disclosure relates to a method for newly defining dedicated MTC system information for an MTC UE since the maximum terminal band that the MTC UE is capable of receiving is restricted to 6 PRBs irrespective of a system band, and relates to a new transmission method and a transmission resource configuration method for transmitting MTC system information, instead of a system information transmission resource that has been typically used for a normal UE.

First, MTC SIB1 is MTC system information that an MTC UE receives first after receiving an MIB. In the present disclosure, MTC SIB1 uses fixed time-domain scheduling in a similar manner as that of typical SIB1. In other words, a previously defined radio frame period and one or multiple subframes, which are to be used for an MTC SIB1 transmission within the period, are defined in advance. The BS 20 transmits MTC SIB1 in a predetermined subframe. The BS 20 needs to repeatedly transmit MTC SIB1 for an MTC UE having extended coverage. The BS repeatedly transmits MTC SIB1 that is always the same within a BCCH modification period.

The UE 10 performs soft combining of received values of MTC SIB1 in the modification period and performs decoding. The typical BCCH modification period is defined as 32, 64, 128, 256, 512, 1024, 2048, and 4096 radio frames. The BS 20 transmits modification period information to the UE 10 using SIB2. When the MTC UE 10 having extended coverage receives initial MTC SIB1, the MTC UE 10 does not have information associated with a modification period. Therefore, even when MTC SIB1 information has been changed in two neighboring modification periods, the MTC UE 10 assumes the same MTC SIB1 and performs soft combining of all received values of MTC SIB1 and performs decoding.

In the present disclosure, in a process of receiving MTC SIB1, the MTC UE empties a soft buffer that is used for soft combining of MTC SIB1 with respect to a predetermined SFN (e.g., SFN 0), does not perform soft combining associated with previously received MTC SIB1, and performs soft combining of MTC SIB1 received from the predetermined SFN and performs decoding.

As a method of reducing reception complexity and power consumption associated with an MTC UE, a resource allocation region of an MTC UE (for example, a common region or UE-specific region) may be defined separately from an existing UE.

The common region and the UE-specific region may be set by the BS 20.

The common region is a cell-specific region, and common control information for a UE in a cell is transmitted. That is, SIBs (System Information Blocks), RAR (Random Access Response), a paging message, or the like may be transmitted through a corresponding broadcast/multicast region of the common region. Accordingly, an MTC UE in a cell may receive SIBs, an RAR, or a paging message in a corresponding broadcast region.

The UE-specific region is a region set for each MTC UE, and a resource may be allocated through a UE-specific higher layer message. That is, in the case of the UE-specific region, time-frequency resource allocation with respect to a corresponding UE-specific region may be performed through UE-specific RRC signaling.

A time-axis resource with respect to a common region or a UE-specific region may be set based on a subframe or radio frame unit. A frequency domain resource in a common region and a UE-specific region may be allocated based on an MTC subband or narrowband unit. That is, an MTC subband or a narrowband indicates a unit of a frequency domain resource for a common region or a UE-specific region allocated to an MTC UE. For example, the MTC subband may be a unit corresponding to a predetermined number of consecutive PRBs, for example, 6 Physical Resource Blocks.

Hereinafter, a method of configuring an MTC subband will be described in detail.

Table 7 shows the maximum number of physical resource blocks for each system band.

TABLE 7

| BW | 1.4 MHz | 3 MHz | 5 MHz | 10 MHz | 15 MHz | 20 MHz |
|---|---|---|---|---|---|---|
| $N_{PRB}$ | 6 | 15 | 25 | 50 | 75 | 100 |

When the BS 20 transmits information (for example, system information, which is transmitted in a common region or a UE-specific region,) and when the UE 10 receives the system information, a system bandwidth including two or more physical resource blocks may be configured with one or more subbands defined by two or more physical resource blocks. In this instance, at least one remaining physical resource block may be located in the center of the system bandwidth. As described above, a subband may be defined by 6 physical resource blocks.

For example, when an MTC UE is supported in a cell, and when a system bandwidth of the corresponding cell includes $N_{PRB}$ physical resource blocks, the corresponding system bandwidth may be divided into a total of $\lfloor N_{PRB}/6 \rfloor$ MTC subbands, from 0, 1, . . . , to $\lfloor N_{PRB}/6 \rfloor_{-1}$. In this instance, $\lfloor N_{PRB}/6 \rfloor$ indicates a quotient of $N_{PRB}/6$.

Table 8 indicates the number of subbands and the number of remaining physical resource blocks that are not included in a subband when subbands of frequency resources are configured based on a unit of 6 physical resource blocks.

TABLE 8

| BW | #Subbands | #Remaining PRBs |
|---|---|---|
| 1.4 MHz | 1 | 0 |
| 3 MHz | 2 | 3 |
| 5 MHz | 4 | 1 |
| 10 MHz | 8 | 2 |
| 15 MHz | 12 | 3 |
| 20 MHz | 16 | 4 |

By taking into consideration that a PBCH and a PSS/SSS are transmitted in the 6 central physical resource blocks, the present disclosure provides a method of configuring a subband to enable a remaining physical resource block to be located in the center of frequency resources as a method of configuring a subband for an MTC UE.

Table 9 shows a physical resource block index of a beginning of each subband for each system band, as an example of using a method of configuring a subband for an MTC UE.

In association with a subband for a single subband index, 6 physical resource blocks having consecutive physical resource block indices from a physical resource block index of Table 9 are defined as a subband.

TABLE 9

| Subband index | BW | | | | | |
|---|---|---|---|---|---|---|
| | 1.4 MHz | 3 MHz | 5 MHz | 10 MHz | 15 MHz | 20 MHz |
| 0 | 0 | 0 | 0 | 0 | 0 | 0 |
| 1 | — | 9 | 6 | 6 | 6 | 6 |
| 2 | — | — | 13 | 12 | 12 | 12 |
| 3 | — | — | 19 | 18 | 18 | 18 |
| 4 | — | — | — | 26 | 24 | 24 |
| 5 | — | — | — | 32 | 30 | 30 |
| 6 | — | — | — | 38 | 36 | 36 |
| 7 | — | — | — | 44 | 45 | 42 |
| 8 | — | — | — | — | 51 | 52 |
| 9 | — | — | — | — | 57 | 58 |
| 10 | — | — | — | — | 63 | 64 |
| 11 | — | — | — | — | 69 | 70 |
| 12 | — | — | — | — | — | 76 |
| 13 | — | — | — | — | — | 82 |
| 14 | — | — | — | — | — | 88 |
| 15 | — | — | — | — | — | 94 |

In other words, as shown in Table 7, when a system bandwidth corresponds to 3 MHz, 5 MHz, and 15 MHz, respectively, the system bandwidth is configured with 2, 4, and 12 subbands, respectively, as shown in Table 8. Also, the number of remaining physical resource blocks may be 3, 1, and 3, respectively.

When the number of remaining physical resource blocks is 1, the remaining physical resource block may be located in the center of the system bandwidth. When the number of remaining physical resource blocks is an odd number greater than 1, at least one of the remaining physical resource blocks may be located in the center of the system bandwidth.

Figure 7:
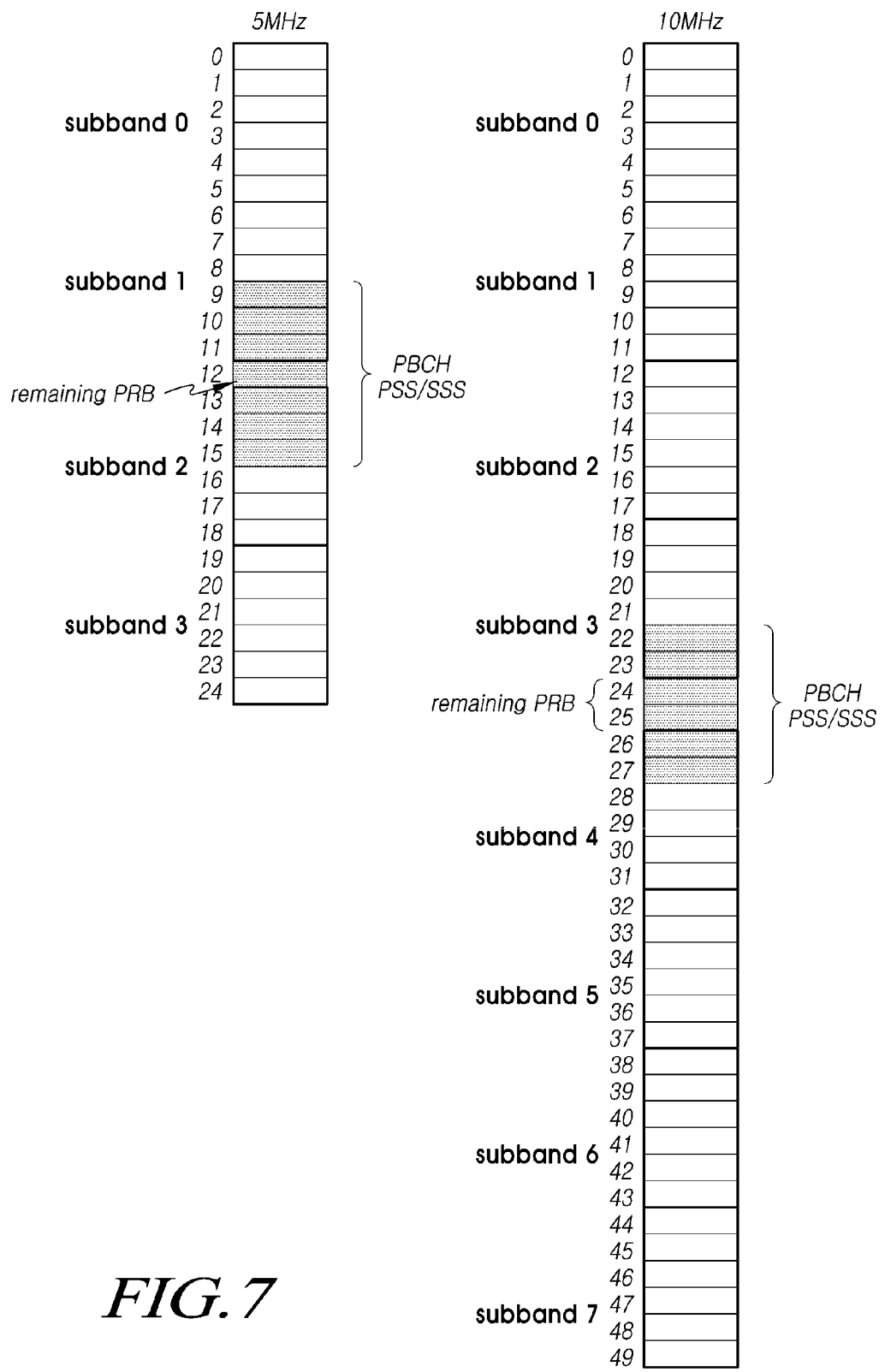
FIG. 7 illustrates subbands configured for transmitting MTC system information in a 5 MHz system band and a 10 MHz system band.

FIG. 7 illustrates subbands configured for transmitting MTC system information in a 5 MHz system band and a 10 MHz system band.

Referring to FIG. 7, when the system bandwidth is 5 MHz, a physical resource block includes 12 15 KHz-subcarriers, and the system bandwidth includes 25 physical resource blocks. In this instance, the present disclosure may not be limited to the example in which a single subcarrier corresponds to 15 KHz, and a single subcarrier may correspond to another frequency band, such as 7.5 KHz.

The system bandwidth includes 4 subbands, and the number of remaining physical resource block is 1. The system bandwidth is configured with 4 subbands to enable the remaining physical resource block to be located in the center of the system bandwidth.

In other words, when the system bandwidth is 5 MHz, a physical resource block includes 12 15 KHz-subcarriers, and the system bandwidth includes 25 physical resource blocks numbered from 0 to 24.

The system bandwidth is configured with four subbands, the subbands including physical resource blocks numbered from 0 to 5, physical resource blocks numbered from 6 to 11, physical resource blocks numbered from 13 to 18, and physical resource blocks numbered from 19 to 24, respectively, and one remaining physical resource block may be located in physical resource block number 12.

The central physical resource blocks in FIG. 7 indicate 6 central physical resource blocks used for transmission of a PBCH or a PSS/SSS. Therefore, the remaining physical resource block (physical resource block 12) may overlap physical resource blocks in which a PBCH, PSS, or SSS is transmitted.

Referring to FIG. 7, when the system bandwidth is 10 MHz, a physical resource block may include 12 15 KHz-subcarriers, and the system bandwidth may include 50 physical resource blocks.

The system bandwidth includes 8 subbands, and the number of remaining physical resource block is 2. The system bandwidth is configured with 8 subbands to enable the remaining physical resource block to be located in the center of the system bandwidth.

Figure 8:
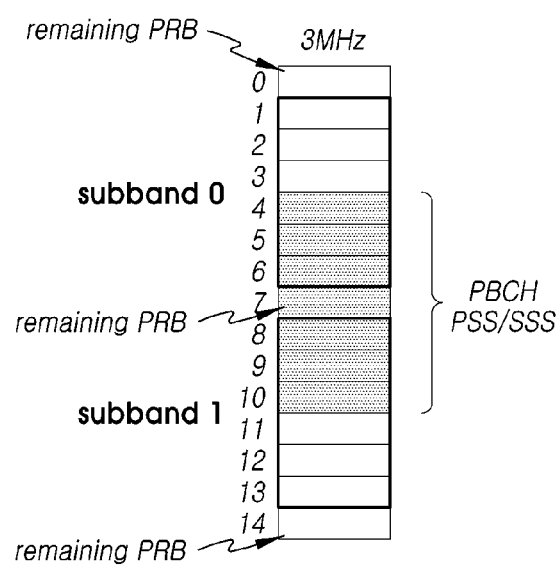
FIG. 8 illustrates subbands configured for transmitting MTC system information in a 3 MHz system band.

FIG. 8 illustrates subbands configured for transmitting MTC system information in a 3 MHz-system band.

Referring to FIG. 8, when the system bandwidth is 3 MHz, a physical resource block includes 12 15 KHz-subcarriers, and the system bandwidth includes 15 physical resource blocks.

The system bandwidth includes 2 subbands, and the number of remaining physical resource block is 3. The system bandwidth is configured with 2 subbands to enable the at least one remaining physical resource block to be located in the center of the system bandwidth. In addition, other remaining physical resource blocks that are not located in the center of the system bandwidth may be located at both ends of the system bandwidth.

In other words, when the system bandwidth is 3 MHz, the system bandwidth may include 15 physical resource blocks numbered from 0 to 14.

The system bandwidth may be configured with two subbands, the subbands including physical resource blocks numbered from 1 to 7 and physical resource blocks numbered from 8 to 13, respectively. One remaining physical resource block is located in physical resource block number 7, and two remaining physical resource blocks are located in physical resource blocks numbers 0 and 14, respectively.

The one remaining physical resource block (physical resource block number 7), located in the center in FIG. 8, may overlap physical resource blocks in which a PBCH, a PSS, or an SSS is transmitted.

Table 10 shows a physical resource block index of a beginning of each subband for each system band, as an example of using a method of configuring a subband for an MTC UE, which has been described with reference to FIG. 8.

TABLE 10

| Subband index | BW | | | | | |
|---|---|---|---|---|---|---|
| | 1.4 MHz | 3 MHz | 5 MHz | 10 MHz | 15 MHz | 20 MHz |
| 0 | 0 | 1 | 0 | 1 | 1 | 2 |
| 1 | — | 8 | 6 | 7 | 7 | 8 |
| 2 | — | — | 13 | 13 | 13 | 14 |
| 3 | — | — | 19 | 19 | 19 | 20 |
| 4 | — | — | — | 27 | 25 | 26 |
| 5 | — | — | — | 33 | 31 | 32 |
| 6 | — | — | — | 39 | 37 | 38 |
| 7 | — | — | — | 45 | 44 | 44 |
| 8 | — | — | — | — | 50 | 50 |
| 9 | — | — | — | — | 56 | 56 |
| 10 | — | — | — | — | 62 | 62 |
| 11 | — | — | — | — | 68 | 68 |

TABLE 10-continued

| Subband index | BW | | | | | |
|---|---|---|---|---|---|---|
| | 1.4 MHz | 3 MHz | 5 MHz | 10 MHz | 15 MHz | 20 MHz |
| 12 | — | — | — | — | — | 74 |
| 13 | — | — | — | — | — | 80 |
| 14 | — | — | — | — | — | 86 |
| 15 | — | — | — | — | — | 92 |

Figure 9:
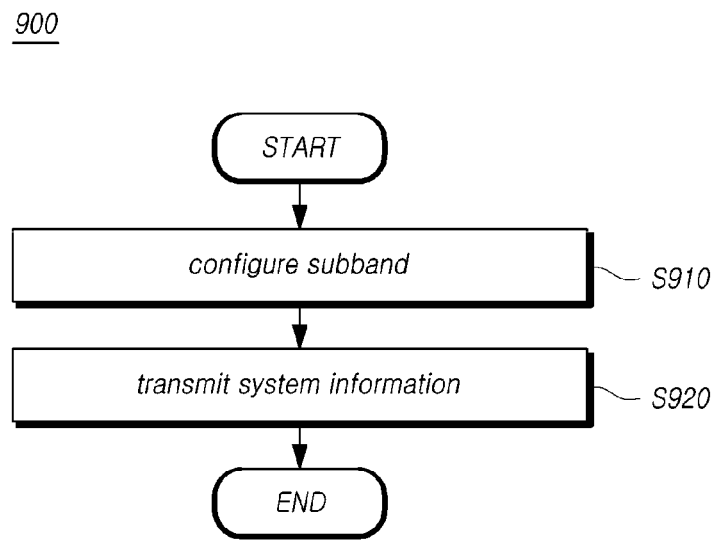
FIG. 9 is a flowchart illustrating a method of transmitting system information by a base station according to an embodiment of the present disclosure.

FIG. 9 is a flowchart illustrating a method of transmitting system information by a BS according to an embodiment of the present disclosure.

Referring to FIG. 9, a method 900 of transmitting system information by the BS 20 may include configuring a system bandwidth, which includes two or more physical resource blocks, with one or more subbands defined by two or more physical resource blocks, to enable at least one remaining physical resource block to be located in the center of the system bandwidth in operation S910, and transmitting system information to a predetermined UE using a subband in operation S920.

In operation S920 for transmitting system information to a predetermined UE using a subband, system information may be repeatedly transmitted using a subband defined according to various embodiments as follows.

In this instance, in operation S910 of configuring a subband, when the system bandwidth includes $N_{PRB}$ physical resource blocks, the system bandwidth may be configured with $\lfloor N_{PRB}/6 \rfloor$ subbands ($\lfloor N_{PRB}/6 \rfloor$ indicates a quotient of $N_{PRB}/6$). In this instance, in operation S920 of transmitting the system information, the system information may be transmitted to the predetermined UE 10 using one of the $\lfloor N_{PRB}/6 \rfloor$ subbands.

Figure 10:
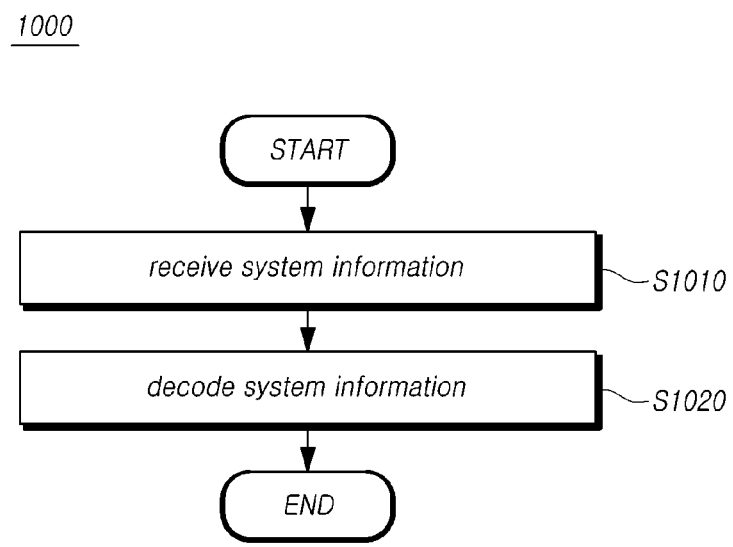
FIG. 10 is a flowchart illustrating a method of receiving system information by user equipment according to an embodiment of the present disclosure.

FIG. 10 is a flowchart illustrating a method of receiving system information by a UE according to an embodiment of the present disclosure.

Referring to FIG. 10, a method 1000 of receiving system information by the UE 10 may include receiving system information from a BS using one or more subbands defined by two or more physical resource blocks, in which a system bandwidth is configured with two or more physical resource blocks to enable at least one remaining physical resource block to be located in the center of the system bandwidth in operation S1010, and decoding the system information in operation S1020.

In operation S1010 of receiving the system information from the BS 20 using a subband, the UE 10 may repeatedly receive the system information using a subband defined according to various embodiments as follows.

In operation S1010 of receiving a subband, when the system bandwidth includes $N_{PRB}$ physical resource blocks, the system bandwidth may be configured with $\lfloor N_{PRB}/6 \rfloor$ subbands ($\lfloor N_{PRB}/6 \rfloor$ indicates the quotient of $N_{PRB}/6$), and the system information may be received from the BS 20 using one of the $\lfloor N_{PRB}/6 \rfloor$ subbands.

The subband described above may be defined by 6 physical resource blocks.

According to the maximum number of physical resource blocks for each system band as shown in Table 7, when a system bandwidth corresponds to 3 MHz, 5 MHz, and 15 MHz, respectively, the system bandwidth is configured with 2, 4, and 12 subbands, respectively, as shown in Table 8. Also, the number of remaining physical resource blocks may be 3, 1, and 3, respectively.

In this instance, as illustrated in FIG. 7, when the number of remaining physical resource blocks (remaining PRBs) is 1, the remaining physical resource block may be located in the center of the system bandwidth. Also, as illustrated in FIG. 8, when the number of remaining physical resource blocks is an odd number greater than 1, at least one of the remaining physical resource blocks may be located in the center of the system bandwidth.

The physical resource block may include 12 15 KHz-subcarriers. As illustrated in FIG. 7, when the system bandwidth is 5 MHz, the system bandwidth may include 25 physical resource blocks and the system bandwidth may be configured with 4 subbands. The number of remaining physical resource blocks is 1, and the system bandwidth may be configured with 4 subbands to enable the remaining physical resource block to be located in the center of the system bandwidth.

In other words, when the system bandwidth is 5 MHz, a physical resource block includes 12 15 KHz-subcarriers, and the system bandwidth includes 25 physical resource blocks numbered from 0 to 24.

The system bandwidth may be configured with four subbands, the subbands including physical resource blocks numbered from 0 to 5, physical resource blocks numbered from 6 to 11, physical resource blocks numbered from 13 to 18, and physical resource blocks numbered from 19 to 24, respectively, and one remaining physical resource block may be located in physical resource block number 12.

As illustrated in FIG. 7, 6 central physical resource blocks may be used for the transmission of a PBCH or PSS/SSS. Thus the remaining physical resource block (physical resource block 12) may overlap physical resource blocks in which a PBCH, a PSS, or an SSS is transmitted.

Hereinafter, frequency-domain scheduling to be used for transmitting MTC SIBx (SIB1 to SIB16) will be described using a defined subband of an MTC UE. First, using a defined subband of an MTC UE, frequency-domain scheduling to be used for transmitting MTC SIB1 will be described.

Embodiment 1: Transmission of MTC SIB1

The BS 20 may use one of two or more subbands configured as shown in one of Table 9 and Table 10 in a subframe for transmitting MTC SIB1. In this instance, a system bandwidth is 1.4 MHz, and only a single subband exists. Thus the BS 20 may not need to select a subband in a subframe for transmitting MTC SIB1.

Embodiment 1-1

The BS 20 uses a predetermined or fixed subband to transmit MTC SIB1. For example, a subband corresponding to subband index 0 may be used for transmitting MTC SIB1.

Embodiment 1-2

The BS 20 may select one of at least one subband configured as shown in one of Table 9 and Table 10. The BS 20 may signal a subband index of the selected subband to an MTC UE using an MIB. The BS 20 may use the corresponding subband for transmitting MTC SIB1.

Embodiment 1-3 n subbands available for transmitting MTC SIB1 are defined in advance, one of the n subbands is selected, and information associated with the selected subband is signaled to an MTC UE using an MIB. Here, n may be smaller than the number of subbands for each band, as shown in Table 8, but without limitation thereto.

As an embodiment of the present disclosure, the number of subbands that are signaled for each system band may be previously defined to 1, 2, or 4, as shown in Table 11. The BS 20 may select one of the previously defined subbands, may signal a subband index to an MTC UE using an MIB, and may use the corresponding subband for transmitting MTC SIB1.

TABLE 11

| Subband | BW | | | | | |
|---|---|---|---|---|---|---|
| index | 1.4 MHz | 3 MHz | 5 MHz | 10 MHz | 15 MHz | 20 MHz |
| 0 | 0 | 0 | 0 | 0 | 0 | 0 |
| 1 | — | 9 | 6 | 6 | 6 | 6 |
| 2 | — | — | 13 | 38 | 63 | 88 |
| 3 | — | — | 19 | 44 | 69 | 94 |

As another embodiment, the number of subbands capable of transmitting MTC SIB1 may be defined as 1 or 2, as shown in Table 12. The BS 20 may select one of the two subbands, may signal a subband index to an MTC UE using an MIB, and may use the corresponding subband for transmitting MTC SIB1.

TABLE 12

| Subband | BW | | | | | |
|---|---|---|---|---|---|---|
| index | 1.4 MHz | 3 MHz | 5 MHz | 10 MHz | 15 MHz | 20 MHz |
| 0 | 0 | 0 | 0 | 0 | 0 | 0 |
| 1 | — | 9 | 19 | 44 | 69 | 94 |

Embodiment 1-4

The BS 20 may use, as a subband index, a result value obtained by performing a modulo (Modulus) operation on a Physical Cell Identity (PCID) and the number of subbands for each band (the number of subbands per bandwidth) of Table 8. As shown in one of Table 9 and Table 10, MTC SIB1 may be transmitted using a subband that is mapped to a subband index.

Alternatively, a result value obtained by performing a modulo operation on the PCID and the number of subbands n which is defined in advance for transmitting MTC SIB1 of Embodiment 1-3, may be used as a subband index. As shown in Table 11 or Table 12, MTC SIB1 may be transmitted using a subband that is mapped to a subband index.

Subsequently, in association with n subbands previously defined for transmitting MTC SIB1, the BS 20 may change a subband based on an MTC SIB1 transmission period or a previously defined frequency-hopping period by performing frequency hopping with respect to subband indices, and the BS 20 may perform transmission. In this instance, the present disclosure may, in advance, define and use a frequency-hopping pattern as a cyclic repeated form. A cyclic repeated form indicates a form that uses each of subband indices from 0 to m−1 once while frequency hopping is performed m times when a frequency-hopping pattern with respect to m subbands is generated, and uses a previous frequency-hopping pattern for further frequency hopping to be performed m times.

For example, when n=4, the BS 20 may perform frequency hopping to change a subband according to a repeated order of subband index 0→2→1→3→0→2→1→3 . . . based on an MTC SIB1 transmission period or a previously defined frequency-hopping period, and may use the changed subband for transmitting MTC SIB1.

Alternatively, the BS 20 may define two subbands, as shown in Table 12, for each MTC SIB1 transmission period, may change a subband according to a repeated order of subband index 0→1→0→1 . . . , and may use the changed subband for transmitting MTC SIB1. However, when the system band is 1.4 MHz, subband index 0 is used. When the system band is 3 MHz, subband index 0 and subband index 1 are repeatedly used.

Also, when a subband index where a new MTC SIB1 starts is s, the BS detects subband index s from a cyclic repeated frequency-hopping pattern, and shifts the frequency-hopping pattern and uses the same in a cyclic repeating-manner.

For example, when n=4 and s=2, the frequency-hopping pattern may be shifted to the right by one, such as 2→1→3→0→2→1→3→0 . . . , and the shifted frequency-hopping pattern is used in a cyclic repeating manner.

Typical SIB1 provides i) information associated with system information mapped to each SIB and ii) information associated with a system information window (SI-window) in which system information may be transmitted. Also, a plurality of pieces of system information may not temporally overlap in the system information window. In this instance, a single piece of system information may be a plurality of SIBs. In this instance, only one SIB may be transmitted in a single subframe in the same system information window. Therefore, the BS may transmit all SIBs such that they do not temporally overlap one another.

Embodiment 2: Transmission of MTC SIBx

MTC SIB1 provides i) information associated with MTC system information mapping and ii) information associated with a system information window used for transmitting MTC system information, in association with MTC SIBx excluding MTC SIB1 (x denotes an integer in the range of 2 to 16, hereinafter referred to as "MTC SIBx").

The BS 20 needs to repeatedly transmit MTC SIBx to an MTC UE having extended coverage. To prevent a plurality of pieces of system information windows used for transmitting a plurality of pieces of MTC system information from temporally overlapping, one MTC SIBx needs to be mapped to one piece of MTC system information. Also, the size of a system information window may be set in view of the number of repetitive transmissions to be used by the BS for repetitive transmission of a plurality of MTC SIBx. MTC SIBx may be repeatedly transmitted in all downlink subframes in a system information window configured for repetitive transmission of MTC SIBx. In this instance, MTC SIBx may not be transmitted in a subframe used for an MIB and MTC SIB1, which are periodically transmitted in a system information window.

Embodiment 2-1

The BS 20 provides, using MTC SIB1, TBS (Transport Block Size) information of MTC SIBx, in addition to MTC system information mapping and system information window configuration information. In this instance, 16 TBSs are defined as shown in Table 13, and 4-bit signaling may be used. The BS 20 may inform the MTC UE 10 of a TBS to be used for MTC SIBx, using MTC SIB1 including 4-bit signaling.

TABLE 13

| TBS index | TBS |
|---|---|
| 0 | 224 |
| 1 | 256 |
| 2 | 280 |
| 3 | 296 |
| 4 | 328 |
| 5 | 336 |
| 6 | 392 |
| 7 | 488 |
| 8 | 552 |
| 9 | 600 |
| 10 | 632 |
| 11 | 696 |
| 12 | 776 |
| 13 | 840 |
| 14 | 904 |
| 15 | 1000 |

In addition to TBS information, MTC SIB1 may provide frequency-domain scheduling information to be used for transmitting MTC SIBx.

The BS 20 may use one of the plurality of subbands configured as shown in one of Table 9 and Table 10 in a subframe for transmitting MTC SIBx.

Embodiment 2-2

The BS 20 selects one of the plurality of subbands configured as shown in one of Table 9 and Table 10. The BS 20 may signal a subband index of the selected subband to an MTC UE using MTC SIB1, and the BS 20 may use the corresponding subband for transmitting MTC SIBx. Alternatively, the BS 20 limits the number of subbands that are signaled for each system band to four, as shown in Table 11, selects one of the four subbands, signals a subband index to the MTC UE 10 using MTC SIB1, and uses the corresponding subband for transmitting MTC SIB1.

Embodiment 2-3

The BS 20 i) defines a subband in which MTC SIBx is to be transmitted in a system information window, as shown in Table 11, ii) repeatedly changes a subband index according to the order 0→2→1→3→0→2→1→3 . . . over time, and iii) performs transmission.

Alternatively, the BS 20 i) defines a subband in which MTC SIBx is to be transmitted in a system information window, as shown in Table 12, ii) repeatedly changes a subband index according to the order 0→1→0→1 . . . over time, and iii) performs transmission. However, when the system band is 1.4 MHz, subband index 0 is used. When the system band is 3 MHz, subband index 0 and subband index 1 are repeatedly used. The time to change a subband index may be a predetermined period value or an MTC SIB1 transmission period value.

Embodiment 2-4

Even when a subband index associated with each MTC SIBx is signaled using MTC SIB1 in Embodiment 2-2, a BS repeatedly changes a subband index over time, from a signaled subband index, as described in Embodiment 2-3, and performs transmission. For example, when subband index 1 is signaled, the order 1→3→0→2→1→3 . . . may be used.

When subband index 2 is signaled, the order 2→1→3→0→2→1 . . . may be used. When subband index 3 is signaled, the order 3→0→2→1→3→0 . . . may be used.

Figure 11:
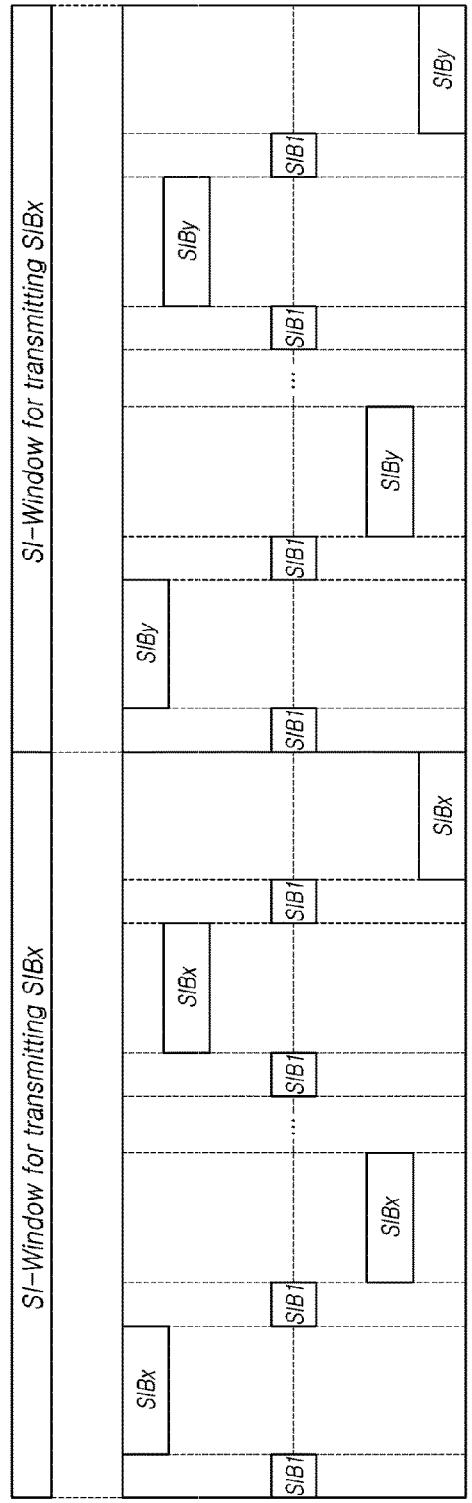
FIG. 11 illustrates a transmission of MTC SIB1.

FIG. 11 illustrates transmission of MTC SIB1.

Referring to FIG. 11, the BS 20 periodically transmits MTC SIB1 (SIB1 in FIG. 9) using 6 central physical resource blocks in frequency resources.

Also, the BS 20 may further transmit two MTC SIBs, for example, MTC SIBx and MTC SIBy, to the MTC UE 10. In this instance, the BS 20 maps the MTC SIBx and MTC SIBy to different pieces of MTC system information and repeatedly transmits the same in different system information windows. Also, a plurality of MTC SIB1 transmission periods may be formed in a system information window, subbands to be used for transmitting MTC SIBs, for example, MTC SIBx and MTC SIBy, may be defined for each MTC SIB1 transmission period, as illustrated in Table 11, and a subband index may be repeatedly changed according to the order 0→2→1→3→0→2→1→3 . . . as described in Embodiment 2-3, and transmission may be performed.

Figure 12:
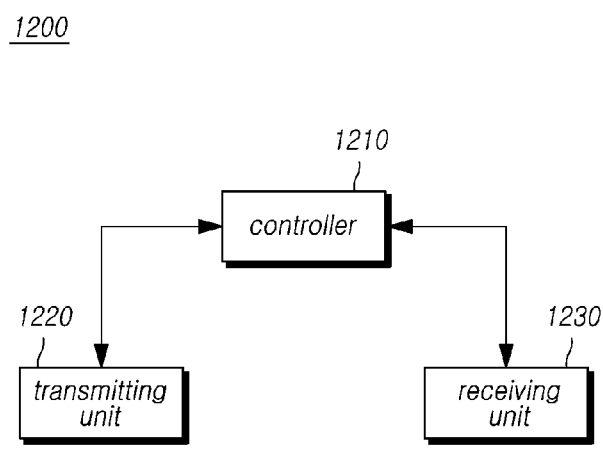
FIG. 12 illustrates a configuration of a base station according to an embodiment of the present disclosure.

FIG. 12 illustrates configuration of a BS according to an embodiment of the present disclosure.

Referring to FIG. 12, a BS 1200 according to an embodiment may include a controller 1210, a transmitting unit 1220, and a receiving unit 1230.

The controller 1210 may control operations of a BS for transmitting MTC system information required for implementing the above-described present disclosure.

The transmitting unit 1220 and the receiving unit 1230 are used for transmitting/receiving, to/from a UE, a signal, a message, and data needed for performing the aforementioned present disclosure.

The controller 1210 may configure a system bandwidth, which includes two or more physical resource blocks, with one or more subbands defined by two or more physical resource blocks, to enable at least one remaining physical resource block to be located in the center of the system bandwidth. The transmitting unit 1220 may transmit system information to a predetermined UE using a subband.

In this instance, when the system bandwidth includes $N_{PRB}$ physical resource blocks, the controller 1210 may configure the system bandwidth with $\lfloor N_{PRB}/6 \rfloor$ subbands ($\lfloor N_{PRB}/6 \rfloor$ indicates a quotient of $N_{PRB}/6$). In this instance, the transmitting unit 1220 may transmit the system information to the predetermined UE 10 using one of the $\lfloor N_{PRB}/6 \rfloor$ subbands.

Figure 13:
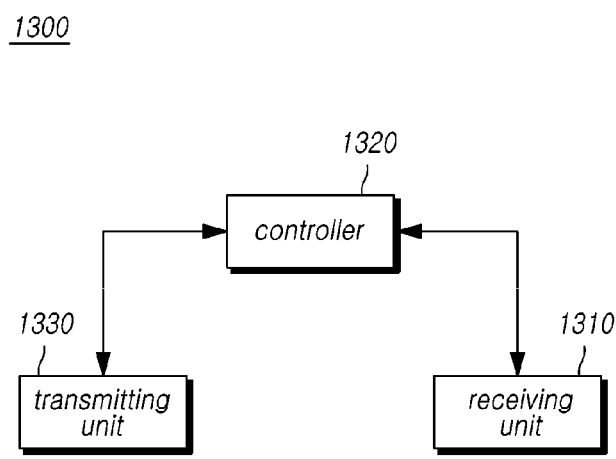
FIG. 13 illustrates a configuration of user equipment according to an embodiment of the present disclosure.

FIG. 13 illustrates configuration of a UE according to an embodiment of the present disclosure.

Referring to FIG. 13, a UE 1300 according to an embodiment of the present disclosure includes a receiving unit 1310, a controller 1320, and a transmitting unit 1330.

The receiving unit 1310 may receive, from a BS, downlink control information, data, and a message through a corresponding channel.

The controller 1320 may control operations of a UE for transmitting MTC system information required for implementing the above-described present disclosure.

The transmitting unit 1330 transmits, to the BS, uplink control information, data, and a message through a corresponding channel.

The receiving unit 1310 may receive system information from a BS using one or more subbands defined by two or more physical resource blocks, in which system bandwidth is configured with two or more physical resource blocks to enable at least one remaining physical resource block to be located in the center of the system bandwidth.

The controller 1320 may decode received system information.

The subband described above may be defined by 6 physical resource blocks.

According to the maximum number of physical resource blocks for each system band shown in Table 7, when the system bandwidth corresponds to 3 MHz, 5 MHz, and 15 MHz, the system bandwidth is configured with 2, 4, and 12 subbands, respectively, as shown in Table 8. Also, the number of remaining physical resource blocks may be 3, 1, and 3, respectively.

In this instance, as illustrated in FIG. 7, when the number of remaining physical resource blocks (remaining PRBs) is 1, the remaining physical resource block may be located in the center of the system bandwidth. Also, as illustrated in FIG. 8, when the number of remaining physical resource blocks is an odd number greater than 1, at least one of the remaining physical resource blocks may be located in the center of the system bandwidth.

The physical resource block may include 12 15 KHz-subcarriers. As illustrated in FIG. 7, when the system bandwidth is 5 MHz, the system bandwidth may include 25 physical resource blocks and the system bandwidth may be configured with 4 subbands. The number of remaining physical resource blocks is 1, and the system bandwidth may be configured with 4 subbands to enable the remaining physical resource block to be located in the center of the system bandwidth.

In other words, when the system bandwidth is 5 MHz, a physical resource block includes 12 15 KHz-subcarriers, and the system bandwidth includes 25 physical resource blocks numbered from 0 to 24.

The system bandwidth is configured with four subbands, the subbands including physical resource blocks numbered from 0 to 5, physical resource blocks numbered from 6 to 11, physical resource blocks numbered from 13 to 18, and physical resource blocks numbered from 19 to 24, respectively, and the one remaining physical resource block may be located in physical resource block number 12.

As illustrated in FIG. 7, 6 central physical resource blocks may be used for the transmission of a PBCH or PSS/SSS, and thus the remaining physical resource block (physical resource block number 12) may overlap physical resource blocks in which a PBCH, a PSS, or an SSS is transmitted.

The content associated with standards or standard documents, mentioned in the above-described embodiments, has been omitted for simple description of the present specification, but it may be a part of the present specification. Therefore, when a part of the content associated with the standard and standard documents is added to the present specification or is specified in the claims, it should be construed as a part of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of transmitting system information by a base station, the method comprising:
 configuring a system bandwidth including two or more physical resource blocks with one or more subbands defined by two or more physical resource blocks to enable at least one remaining physical resource block to be located in a center of the system bandwidth; and transmitting the system information to a predetermined user equipment (UE) using the subband, wherein the subband is defined by six physical resource blocks; and wherein:

when the system bandwidth is 3 MHz and 5 MHz, the system bandwidth is configured with 2 subbands and 4 subbands, respectively, and a number of remaining physical resource blocks is 3 and 1, respectively;

when the number of remaining physical resource blocks is 1, the remaining physical resource block is located in the center of the system bandwidth; and when the number of remaining physical resource blocks is an odd number greater than 1, at least one of the remaining physical resource blocks is located in the center of the system bandwidth.

2. The method as claimed in claim 1, wherein:

the configuring the subband comprises configuring the system bandwidth with $\lfloor N_{PRB}/6 \rfloor$ subbands ($\lfloor N_{PRB}/6 \rfloor$ indicates a quotient of $N_{PRB}/6$) when the system bandwidth includes $N_{PRB}$ physical resource blocks; and the transmitting the system information comprises transmitting the system information to the predetermined UE using one of the $\lfloor N_{PRB}/6 \rfloor$ subbands.

3. The method as claimed in claim 1, wherein, when the system bandwidth is 15 MHz, the system bandwidth is configured with 12 subbands, and the number of remaining physical resource blocks is 3; and at least one of the remaining physical resource blocks is located in the center of the system bandwidth.

4. The method as claimed in claim 1, wherein, when the system bandwidth is 5 MHz, the physical resource block includes 12 15 KHz-subcarriers, and the system bandwidth includes 25 physical resource blocks;

the system bandwidth includes 4 subbands, and the number of remaining physical resource blocks is 1; and the system bandwidth is configured with 4 subbands to enable the remaining physical resource block to be located in the center of the system bandwidth.

5. The method as claimed in claim 1, wherein, when the system bandwidth is 5 MHz, the physical resource block includes 12 15 KHz-subcarriers, and the system bandwidth includes 25 physical resource blocks numbered from 0 to 24;

the system bandwidth includes four subbands, the subbands including physical resource blocks numbered from 0 to 5, physical resource blocks numbered from 6 to 11, physical resource blocks numbered from 13 to 18, and physical resource blocks numbered from 19 to 24, respectively, and one remaining physical resource block is located in a physical resource block numbered 12.

6. The method as claimed in claim 1, wherein the remaining physical resource block overlaps physical resource blocks in which a physical broadcast channel (PBCH), a primary synch signal (PSS), or an secondary synch signal (SSS) is transmitted.

7. A method of receiving system information by a user equipment (UE), the method comprising:

receiving the system information from a base station using one or more subbands defined by two or more physical resource blocks, wherein a system bandwidth is configured with two or more physical resource blocks to enable at least one remaining physical resource block to be located in a center of the system bandwidth; and decoding the system information, wherein the subband is defined by six physical resource blocks; and wherein:

when the system bandwidth is 3 MHz and 5 MHz, the system bandwidth is configured with 2 subbands and 4 subbands, respectively, and a number of remaining physical resource blocks is 3 and 1, respectively;

when the number of remaining physical resource blocks is 1, the remaining physical resource block is located in the center of the system bandwidth; and when the number of remaining physical resource blocks is an odd number greater than 1, at least one of the remaining physical resource blocks is located in the center of the system bandwidth.

8. The method as claimed in claim 7, wherein the receiving the system information comprises:

configuring the system bandwidth with $\lfloor N_{PRB}/6 \rfloor$ subbands ($\lfloor N_{PRB}/6 \rfloor$ indicates a quotient of $N_{PRB}/6$) when the system bandwidth includes $N_{PRB}$ physical resource blocks; and receiving the system information from the base station using one of the $\lfloor N_{PRB}/6 \rfloor$ subbands.

9. The method as claimed in claim 7, wherein, when the system bandwidth is 15 MHz, the system bandwidth is configured with 12 subbands, and the number of remaining physical resource blocks is 3; and at least one of the remaining physical resource blocks is located in the center of the system bandwidth.

10. The method as claimed in claim 7, wherein, when the system bandwidth is 5 MHz, the physical resource block includes 12 15 KHz-subcarriers, and the system bandwidth includes 25 physical resource blocks;

the system bandwidth includes 4 subbands, and the number of remaining physical resource blocks is 1; and the system bandwidth is configured with 4 subbands to enable the remaining physical resource block to be located in the center of the system bandwidth.

11. The method as claimed in claim 7, wherein, when the system bandwidth is 5 MHz, the physical resource block includes 12 15 KHz-subcarriers, and the system bandwidth includes 25 physical resource blocks numbered from 0 to 24;

the system bandwidth includes four subbands, the subbands including physical resource blocks numbered from 0 to 5, physical resource blocks numbered from 6 to 11, physical resource blocks numbered from 13 to 18, and physical resource blocks numbered from 19 to 24, respectively, and one remaining physical resource block is located in a physical resource block numbered 12.

12. The method as claimed in claim 7, wherein the remaining physical resource block overlaps physical resource blocks in which a physical broadcast channel (PBCH), a primary synch signal (PSS), or an secondary synch signal (SSS) is transmitted.

13. A user equipment (UE) that receives system information, the UE comprising:

a receiver configured to receive system information from a base station using one or more subbands defined by two or more physical resource blocks, wherein a system bandwidth is configured with two or more physical resource blocks to enable at least one remaining physical resource block to be located in a center of the system bandwidth; and a controller configured to decode the received system information, wherein the subband is defined by six physical resource blocks; and wherein:

when the system bandwidth is 3 MHz and 5 MHz, the system bandwidth is configured with 2 subbands and 4 subbands, respectively, and a number of remaining physical resource blocks is 3 and 1, respectively;

when the number of remaining physical resource blocks is 1, the remaining physical resource block is located in the center of the system bandwidth; and when the number of remaining physical resource blocks is an odd number greater than 1, at least one of the remaining physical resource blocks is located in the center of the system bandwidth.

14. The UE as claimed in claim 13, wherein, when the system bandwidth is 15 MHz,
the system bandwidth is configured with 12 subbands, and the number of remaining physical resource blocks is 3; and
at least one of the remaining physical resource blocks is located in the center of the system bandwidth.

15. The UE as claimed in claim 13, wherein, when the system bandwidth is 5 MHz, the physical resource block includes 12 15 KHz-subcarriers, and the system bandwidth includes 25 physical resource blocks;
the system bandwidth includes 4 subbands, and the number of remaining physical resource blocks is 1; and
the system bandwidth is configured with 4 subbands to enable the remaining physical resource block to be located in the center of the system bandwidth.

16. The UE as claimed in claim 13, wherein, when the system bandwidth is 5 MHz, the physical resource block includes 12 15 KHz subcarriers, and the system bandwidth includes 25 physical resource blocks numbered from 0 to 24;
the system bandwidth includes four subbands, the subbands including physical resource blocks numbered from 0 to 5, physical resource blocks numbered from 6 to 11, physical resource blocks numbered from 13 to 18, and physical resource blocks numbered from 19 to 24, respectively, and one remaining physical resource block is located in a physical resource block numbered 12.

17. The UE as claimed in claim 13, wherein the remaining physical resource block overlaps physical resource blocks in which a physical broadcast channel (PBCH), a primary synch signal (PSS), or an secondary synch signal (SSS) is transmitted.

* * * * *